United States Patent
Deininger et al.

(10) Patent No.: US 7,747,416 B2
(45) Date of Patent: Jun. 29, 2010

(54) SYSTEM AND METHOD FOR BATCH PROCESS CONTROL WITH DIVERSE DISTRIBUTED CONTROL SYSTEM PROTOCOLS

(75) Inventors: Thomas A. Deininger, Ambler, PA (US); Michael Hogan, Schwensville, PA (US); Yingnian Xu, North Wales, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 474 days.

(21) Appl. No.: 11/755,212

(22) Filed: May 30, 2007

(65) Prior Publication Data
US 2007/0283030 A1 Dec. 6, 2007

Related U.S. Application Data

(60) Provisional application No. 60/811,237, filed on Jun. 6, 2006.

(51) Int. Cl.
*G06F 19/00* (2006.01)
(52) U.S. Cl. ...................................... 702/188; 714/100
(58) Field of Classification Search ................. 702/188, 702/182–185
See application file for complete search history.

(56) References Cited

U.S. PATENT DOCUMENTS

| 6,289,252 | B1 | 9/2001 | Wilson et al. |
| 6,629,003 | B1 | 9/2003 | Frizzell et al. |
| 2004/0187093 | A1 | 9/2004 | Hogan |
| 2005/0159828 | A1 | 7/2005 | Deininger et al. |
| 2006/0259160 | A1 | 11/2006 | Hood et al. |
| 2006/0259500 | A1 | 11/2006 | Hood et al. |
| 2007/0078530 | A1 | 4/2007 | Blevins et al. |

FOREIGN PATENT DOCUMENTS

| EP | 1150206 A1 | 10/2001 |
| WO | WO 2005/081134 A1 | 9/2005 |

OTHER PUBLICATIONS

David Emerson, Batch data exchange using XML, Chemical Online, Dec. 29, 2000, pp. 1-7, XP002440763, US.
Dennis Brandl, Batch Markup Language, BatchML, Version 02, World Batch Forum, Sep. 23, 2003, pp. 1-50, XP002440764, US.
C. Deitz, et al., "Writing a Functional Specification For An S88 Batch Project", Chemical Engineering, Aug. 2003.
"Batch Markup Language BatchML.", World Batch Forum, Version 02, Sep. 23, 2003.

*Primary Examiner*—Edward Raymond
(74) *Attorney, Agent, or Firm*—Filip A. Kowalewski

(57) ABSTRACT

A system and method for batch process control with diverse distributed control system (DCS) protocols is disclosed. A run-time extension acts as an adaptation layer that allows a single batch manager to supervise controllers utilizing diverse DCS protocols. The run-time extension receives commands transmitted from the batch supervisor in a first DCS protocol, translates the commands to a second DCS protocol utilized by a controller, and transmits the translated command to the controller to control various equipment associated with the controller. A database automation object (DBA) inputs configuration information from controllers utilizing diverse DCS protocols, extracts equipment information from the configuration information, generates protocol translation logic based on the configuration information, and translates recipe and formula information included in the configuration information into a common format.

38 Claims, 10 Drawing Sheets

SYSTEM AND METHOD FOR BATCH PROCESS CONTROL WITH DIVERSE DISTRIBUTED CONTROL SYSTEM PROTOCOLS This application claims the benefit of U.S. Provisional Application No. 60/811,237, filed Jun. 6, 2006, the disclosure of which is herein incorporated by reference.

BACKGROUND OF THE INVENTION

The present invention relates to distributed control systems (DCS), and more particularly to batch control of process equipment using various DCS protocols.

A distributed control system (DCS) refers to a control system, usually of a manufacturing system, process or any kind of dynamic system, in which the controller elements are not central in location but are distributed throughout the system, with each component sub-system being controlled by one or more controllers. The entire system is generally networked for communication and monitoring. The distributed controllers control various subsystems, such as process equipment. Many legacy DCS systems provide a mechanism for batch control of process equipment. When installing DCS systems, it is common for one vendor to install an entire DCS. Accordingly, legacy DCS systems typically communicate using vendor specific protocols. As process equipment ages and controllers age, different pieces of equipment and controllers need to be replaced at different times. This can be difficult as different vendors utilize different DCS protocols. Furthermore, it is typically very expensive to completely upgrade DCS systems. Accordingly, in many cases, manufacturing plants end up with automation assets from various vendors that cannot communicate with each other.

In recent years, S88, a standard for the implementation of batch systems, has been defined. S88 provides a consistent set of standards and terminology for batch control. This standard was developed to address problems such as lack of a universal model for batch control, difficulty in communicating user requirements, integration among batch automation suppliers, and difficulty in batch control configuration. The S88 standard provides a number of benefits to manufacturing companies in the process industries. However, for plants using legacy DCS systems, the benefits of S88 have not been achieved without expensive equipment upgrades accompanied by extensive re-engineering.

Accordingly, it is desirable to achieve the benefits of S88 for legacy DCS systems, whose configuration paradigms and run-time communication protocols are not "S88 aware", without requiring upgrading or reconfiguration of field equipment.

BRIEF SUMMARY OF THE INVENTION

The present invention provides a method and system for batch process control with diverse DCS protocols. According to an embodiment of the present invention, a run-time extension acts as an adaptation layer between a batch manager and a plurality of controllers utilizing diverse DCS protocols. This allows the diverse controllers to present a consistent interface and interaction model, which allows a single batch manager to simultaneously supervise the diverse controllers. This adaptation layer facilitates interaction between an S88 compatible batch manager and controllers utilizing legacy DCS protocols, without reconfiguration or expensive upgrades.

In one embodiment of the present invention, a command associated with equipment information is received in a first distributed control system (DCS) protocol. A controller associated with the equipment information is then identified, and a second DCS protocol associated with the controller is determined. The command is then translated into the second DCS protocol, and the translated command is transmitted to the identified controller in the second DCS protocol. According to an embodiment of the present invention, the first DCS protocol can be S88 compatible and the second DCS protocol can be a native protocol of a legacy DCS component.

In another embodiment of the present invention, configuration information is received from a plurality of controllers utilizing diverse configuration formats in a distributed control system (DCS). Equipment information is extracted from the diverse configuration information received from plurality of controllers. The extracted equipment information is then mapped into a uniform format. Furthermore, corresponding protocol translation logic is generated for translation between diverse DCS protocols.

These and other advantages of the invention will be apparent to those of ordinary skill in the art by reference to the following detailed description and the accompanying drawings.

DETAILED DESCRIPTION

Figure 1:
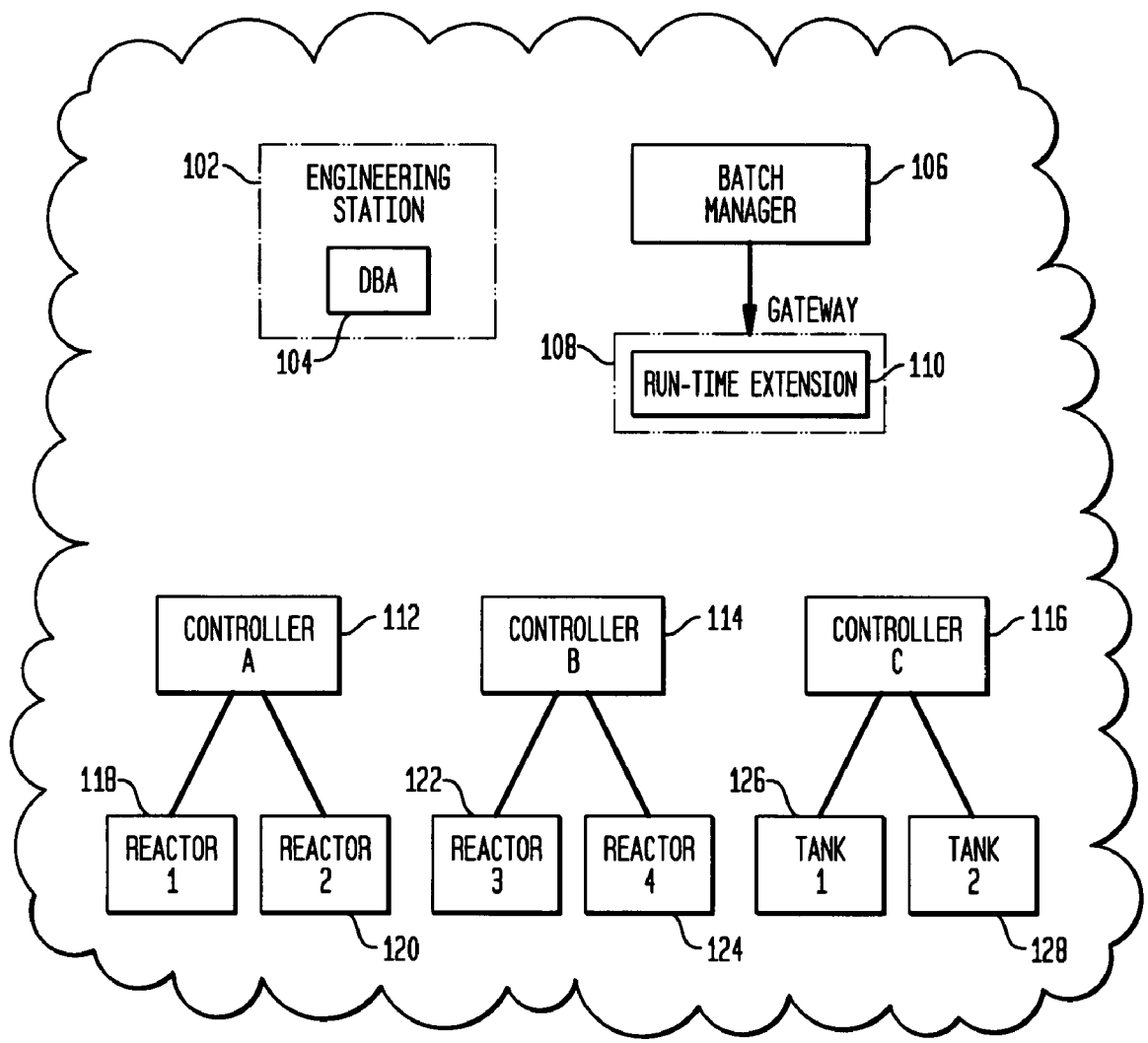
FIG. 1 illustrates a distributed control system according to an embodiment of the present invention.

FIG. 1 illustrates a distributed control system according to an embodiment of the present invention. As illustrated in FIG. 1, the distributed control system includes an engineering station 102, a batch manager 106, a gateway 108, controllers A, B, and C 112, 114, and 116, reactors 1-4 118, 120, 122, and 124, and tanks 1 and 2 126 and 128. Controllers A, B, and C 112, 114, and 116 each utilize vendor specific interfaces, interaction models, and internal logic. The vendor specific interfaces, interaction models, and internal logic used by each of controllers A, B, and C 112, 114, and 116 is referred to herein as the "DCS protocol" of each of controllers A, B, and C 112, 114, and 116. Controllers A, B, and C 112, 114, and 116 may be controllers from legacy DCS systems, and thus communicate using legacy DCS protocols.

The batch manager 106 performs batch process control using a specific DCS format. Batch process control refers to control activities and control functions that provide a means to process finite quantities of input materials by subjecting them to an ordered set of processing activities over a finite period of time using one or more pieces of equipment. According to an embodiment of the present invention, the batch manager 106 can communicate using a format that is compliant with the S88 batch control standard. Hereinafter, the batch manager is described as using DCS protocol which is compatible with the s88 standard, but the present invention is not limited to the S88 standard, and the batch manager 106 can alternatively utilize a variety of other batch control standards.

The gateway 108 controls communication between the batch manager and controllers A, B, and C 112, 114, and 116. The gateway 108 is a device that allows for the translation and management of communication between networks that use different protocols or designs. The gateway 108 can be directly connected to the controllers 112, 114, and 116, such as through a data bus, or can communicate with the controllers 112, 114, and 116 via a wired or wireless data network. The gateway 108 includes a run-time extension 110 which facilitates communication between the batch manager 106 and the various controllers 112, 114, and 116 even though the batch manager 106 and the controllers 112, 114, and 116 communicate using different DCS protocols. The run-time extension 110 allows the diverse controllers 112, 114, and 116 to simultaneously present an interface consistent with the DCS protocol of the batch manager 106, so that the batch manager 106 can simultaneously supervise the diverse controllers 112, 114, and 116.

The engineering station 102 is used to configure various entities, including configuration of the Batch Management System, and operates a database automation object 104, referred to hereinafter as "DBA". The DBA configures the Batch Management System and the various entities that comprise the DCS by modeling information associated with the diverse DCS protocols of the controllers 112, 114, and 116 according to the S88 standard. The DBA 104 will be described in greater detail below with reference to FIG. 3.

Figure 2:
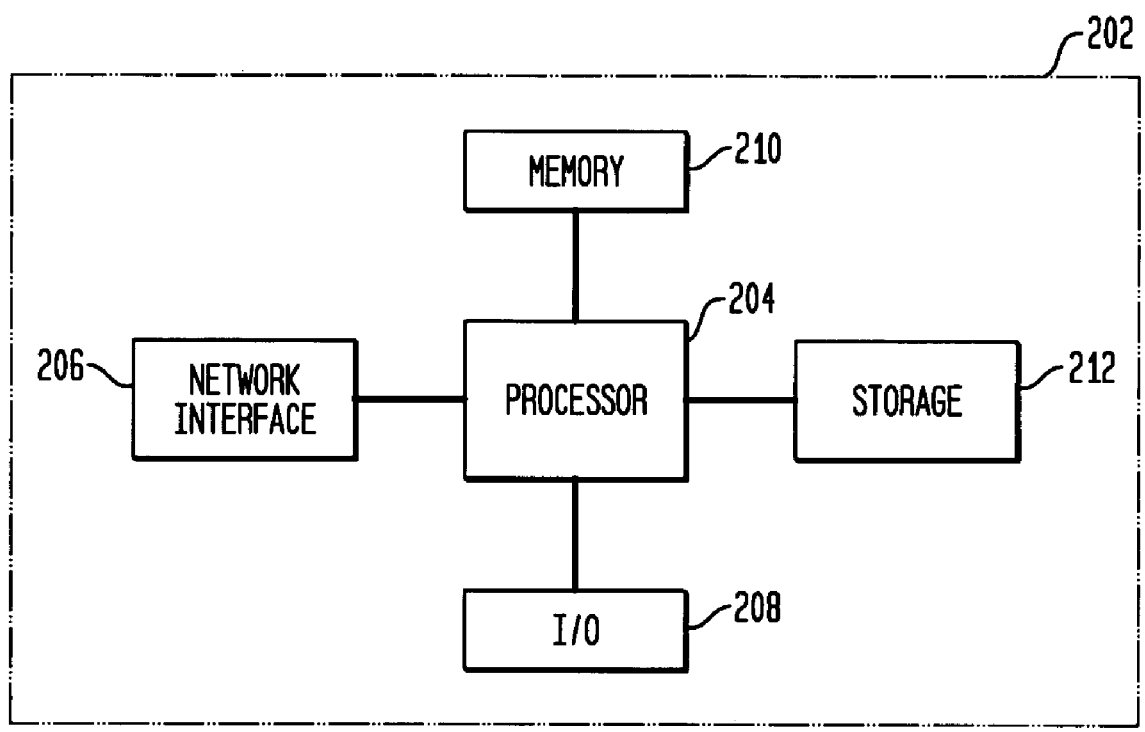
FIG. 2 is a high level block diagram of a computer capable of implementing embodiments of the present invention.

The engineering station 102, the batch manager 106, the gateway 108, and the controllers 112, 114, and 116 can be implemented on computers using well-known computer processors, memory units, storage devices, computer software, and other components. A high level block diagram of such a computer is illustrated in FIG. 2. Computer 202 contains a processor 204 which controls the overall operation of the computer 202 by executing computer program instructions which define such operation. The computer program instructions may be stored in a storage device 212 (e.g., magnetic disk) and loaded into memory 210 when execution of the computer program instructions is desired. Thus, applications, such as the DBA 104, the run-time extension 110, and batch process control applications can be defined by the computer program instructions stored in the memory 210 and/or storage 212 and controlled by the processor 204 executing the computer program instructions. The computer 202 also includes one or more network interfaces 206 for communicating with other devices via a network. The computer 202 also includes other input/output devices 208 that enable user interaction with the computer 202 (e.g., display, keyboard, mouse, speakers, buttons, etc.) One skilled in the art will recognize that an implementation of an actual computer could contain other components as well, and that FIG. 2 is a high level representation of some of the components of such a computer for illustrative purposes.

Figure 3A:
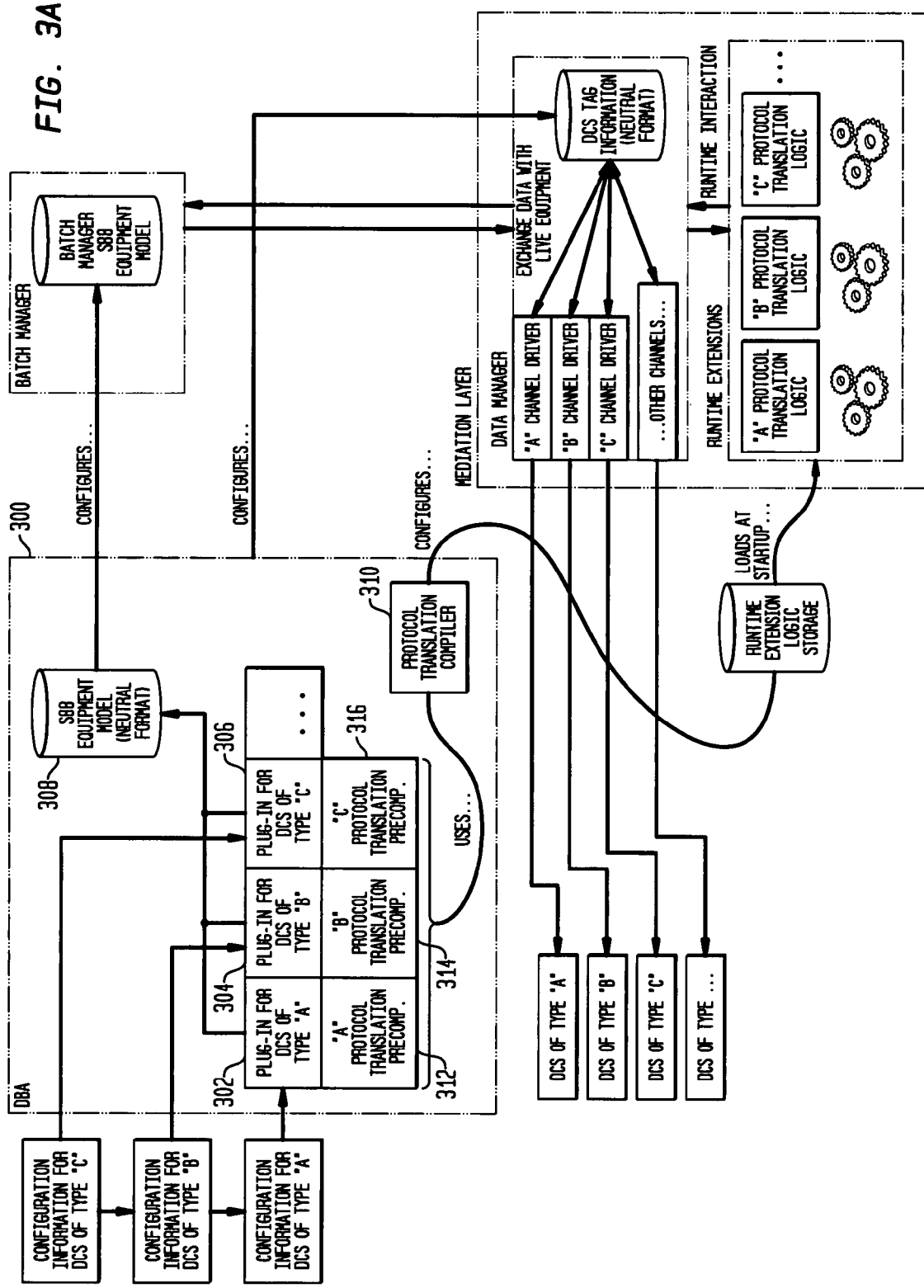
FIG. 3A is a block diagram illustrating a database automation object according to an embodiment of the present invention.

FIG. 3A is a block diagram illustrating the DBA 300 according to an embodiment of the present invention. The DBA 300 of FIG. 3 corresponds to the DBA 104 of FIG. 1. Various operations of the DBA are described in detail in United States Patent Application No. 2005/0159828, which is incorporated herein by reference. The DBA extracts vendor specific information from each of controllers A, B, and C. The information extracted from each controller is vendor specific configuration information that is extracted from vendor specific files in each of controllers A, B, and C, that define configuration information for the legacy DCS corresponding to each of controllers A, B, and C. DBA plug-ins 302, 304, and 306 are used to convert the vendor-specific configuration information from a legacy DCS to an equivalent "neutral" representation within the DBA 300. The DBA plug-ins 302, 304, and 306 each read vendor-specific configuration information from a legacy DCS (i.e., controllers A, B, and C, respectively) and express relevant physical model elements in the target batch management system database. The DBA plug-ins 302, 304, and 306 also read vendor-specific configuration information from a legacy DCS (i.e., controllers A, B, and C, respectively) and express relevant recipe and formula information in the target batch management system database. Accordingly, The DBA plug-ins 302, 304, and 308 analyze vendor specific configuration information for each of controllers A, B, and C, for information that describes batch-related equipment that is managed by each of controllers A, B, and C. The DBA 300 maps the vendor specific configuration information extracted from each of the controllers into equipment information having a uniform format. For example, according to an embodiment of the present invention, vendor specific information extracted from the controllers is converted to an S88 physical model and stored in a database 308. Accordingly, regardless of how equipment is represented in the configuration information of the diverse vendor specific legacy DCS of the controllers, equipment is represented consistently using an S88 compliant format.

Figure 4A:
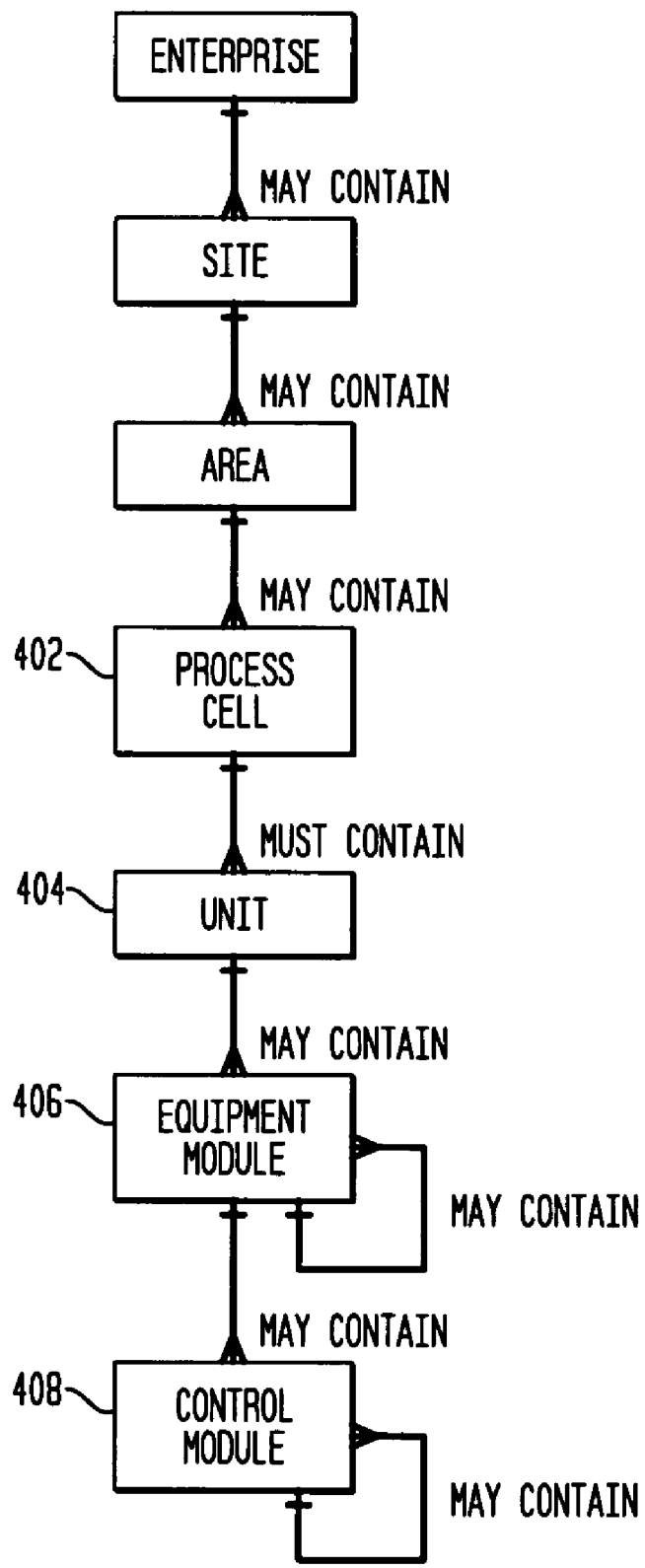
FIG. 4A illustrates an exemplary hierarchical structure of an s88 physical model.

The physical model portion of the S88 standard is that portion of the standard that is used to represent the physical assets of an enterprise involved in batch manufacturing. These assets can be organized in a hierarchical fashion as illustrated in FIG. 4A. The physical models used in the exemplary embodiment of the present invention are concerned with the process cell level 402 and downward. A control module 408 is typically a collection of sensors, actuators, other control modules, and associated processing equipment that, from the point of view of control, is operated as a single entity. An equipment module 406 may be made up of control modules and subordinate equipment modules. An equipment module 406 may be part of a unit or a stand-alone equipment grouping within a process cell 402. If engineered as a stand-alone equipment grouping, it can be an exclusive-use resource or a shared-use resource. An equipment module 406 can carry out a finite number of specific minor processing activities such as dosing and weighing. It combines all necessary physical processing and control equipment required to perform those activities. A procedural control element of an equipment module 406 can be referred to as a "phase". A unit 404 is made up of equipment modules 406 and control modules 408. The modules 406 and 408 that make up the unit may be configured as part of the unit 404 or may be acquired temporarily to carry out specific tasks. One or more major processing activities, such as react, crystallize, and make a solution, can be conducted in a unit 404. A process cell 402 contains all of the units 404, equipment modules 406, and control modules 408 required to make one or more batches.

Figure 4B:
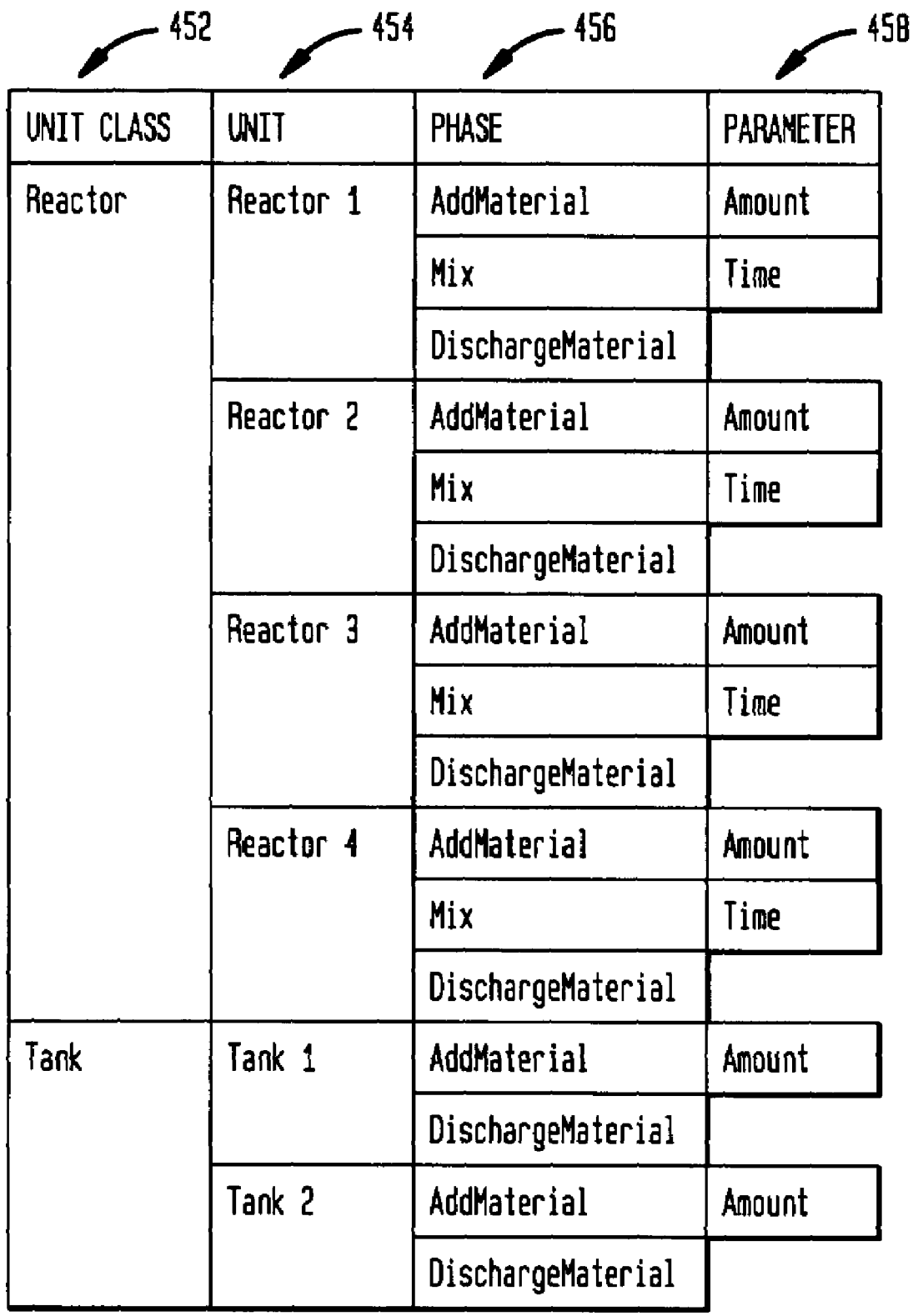
FIG. 4B illustrates an exemplary database table storing an S88 physical model.

FIG. 4B illustrates an exemplary database table storing an S88 physical model for the equipment controlled by the controllers 112, 114, and 116 of FIG. 1. Such as database table as illustrated in FIG. 4B is stored in the database 308 of the DBA 300 as well as in a database in the batch manager 106. As illustrated in FIG. 4, based on the vendor specific information extracted from the controllers 112, 114, and 116, the DBA 300 generates a unit class 452 for each type of equipment controlled by the controllers. Accordingly, the classes of "Reactor" and "tank" exists corresponding to the type of equipment 118-128 controlled by the controllers of FIG. 1. The DBA 300 recognizes each instance of each unit class 452 as a separate unit 454. As illustrated in FIG. 4, the unit class 452 "reactor" has units 454 of "Reactor 1", "Reactor 2", "Reactor 3", and "Reactor 4". The unit class 452 "Tank" has instances of "Tank 1" and "Tank 2". Thus, even though reactor 1 118 and reactor 3 122 of FIG. 1 may be represented differently in the configuration information of the respective DCS protocols of controller A 112 and controller B 114, the DBA 300 recognizes reactor 1 118 and reactor 3 122 as two units of the same type of equipment. As illustrated in FIG. 4B, phases 456 are specified for each unit 454. A phase is a process that the equipment can perform as controlled by the respective controller. For example, each of the phases for each of the reactors are "add material", "mix", and "discharge material", and the phases for each of the tanks are "add material" and "discharge material". Each phase 406 may include a parameter 458 (or multiple parameters) which control the phase 406. For example, the phase 456 "add material" has a parameter 458 "amount" specifying the amount of material to add. The phase 456 "mix" has the parameter 458 "time" specifying the amount of time to mix the material in a reactor. The phase 456 "discharge material" has no parameter 458 because this phase empties the reactor or tank of its contents.

Returning to FIG. 3A, once the DBA 300 maps the vendor specific information to an S88 physical model, the DBA 300 transmits the S88 physical model to the batch manager (106 of FIG. 1). As described above, the DBA plug-ins 302, 304, and 306 generate uniform equipment information from the configuration information extracted from controllers A, B, and C. In addition, the DBA plug-ins 302, 304, and 306 generate vendor specific protocol translation logic for each of controllers A, B, and C based on the configuration information, and transmits the protocol translation logic to the run-time extension (110 of FIG. 1). The vendor specific protocol translation logic associated with a controller defines rules which are used to translate between the native DCS protocol of that controller and the uniform DCS protocol used by the batch manager. The DBA plug-ins 302, 304, and 306 utilize pre-compilers 312, 314, and 316 to generate the vendor specific protocol translation logic. The pre-compilers 312, 314, and 316 are interfaces configured to represent and enforce aspects of a compilation process peculiar to a particular legacy system. The protocol translation logic generated by the pre-compilers 312, 314, and 316 of the pug-ins 302, 304, and 306 is compiled by a protocol translation compiler 310. The DBA 300 transmits the compiled protocol translation logic to the gateway device in order to configure run-time extensions 110 for protocol translation. Thus, the DBA 300 configures the run-time extension 110 to correctly adapt each of the controllers' interaction model to the interaction model expected by the batch manager 106. The rules defined by the protocol translation logic are vendor-specific, but the generated protocol translation logic for controllers A, B, and C can be stored in a common file, using a common format. The protocol translation logic is stored at the gateway in an intermediate, persistent configuration format that can be subsequently re-loaded by the run-time extension at run-time. For example, the protocol translation logic can be stored in an SAH file. An SAH file is an XML document that stores the logic for protocol translation machines to run on the gateway. The DBA 300 also configures a data manger by transmitting DCS tag information extracted from the configuration information of diverse controllers A, B, and C. The data manager exposes DCS information in an essentially neutral format. The A, B, and C channel drivers are capable of translating this neutral representation to DCS specific data exchange protocols. The data manager is used as a proxy layer between the batch manager and the various controllers in the system.

Figure 3B:
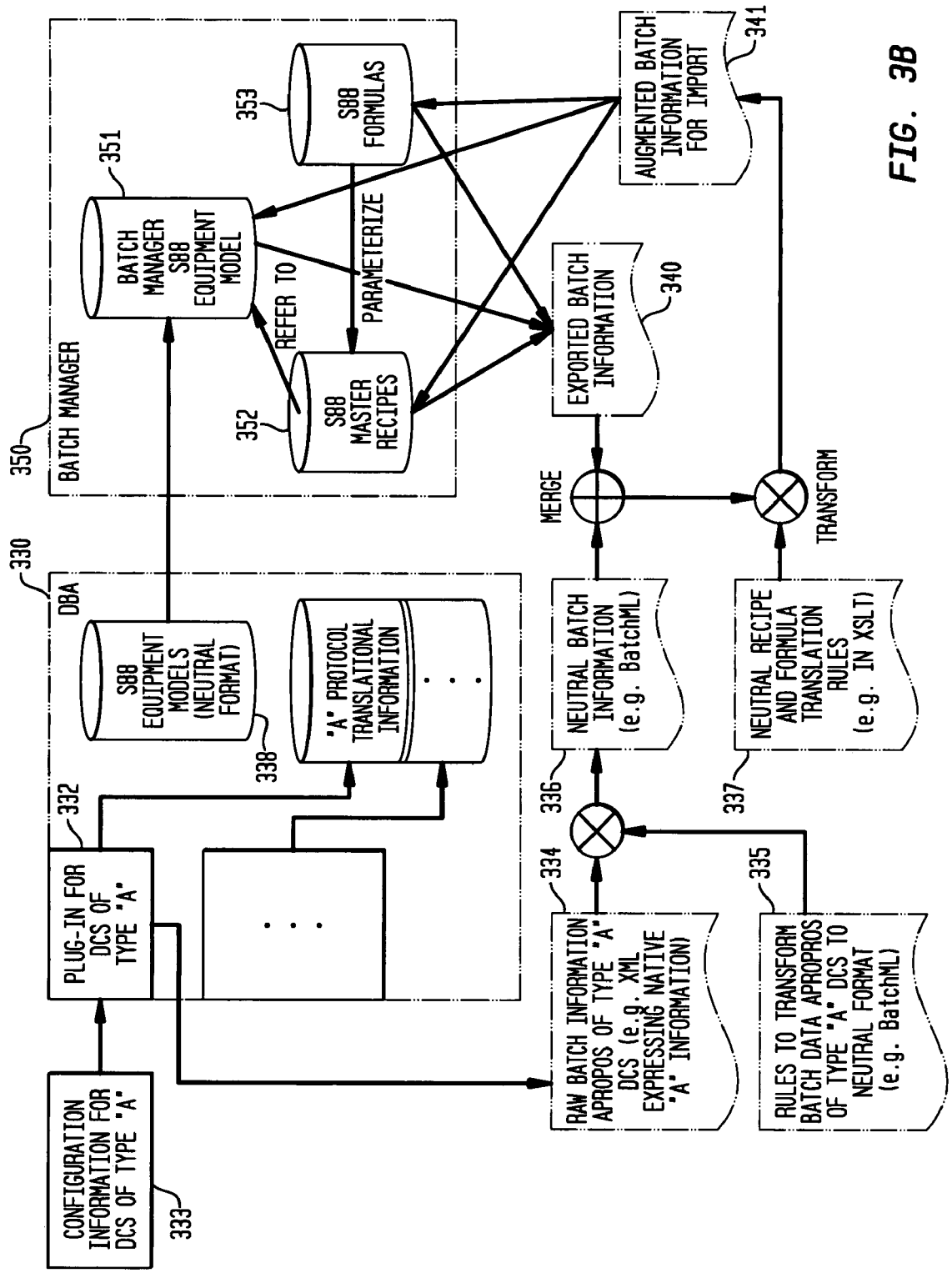
FIGS. 3B and 3C are block diagrams illustrating the database automation object performing recipe and formula translation according to embodiments of the present invention.

In addition to expressing equipment information to the batch manager, tag information to the data manager, and protocol translation information to the Run time extension, as described above, vendor-specific plug-ins may also express information for the purposes of recipe and formula translation. In FIG. 3B, a DBA plug-in 332 for a vendor "A" DCS extracts batch-relevant information from configuration information for DCSs of type "A" (333) and expresses that batch-relevant information in a "native" schema of DCS type "A" (334). The batch-relevant information can include recipe and formula information. As defined in the s88 standard, formula information is a category of recipe information that includes process inputs, process parameters, and process outputs. In the embodiment of FIG. 3B, this information is expressed in XML because it is an open standard and because data expressed in XML format is easily transformed using special languages such as XSLT. This is described in greater detail in U.S. Patent Application No. 2004/0187093, which is incorporated herein by reference. The type "A" batch information is then transformed to a neutral representation format, such as BatchML (336) using "A"-to-neutral transformation rules (335).

In the embodiment of FIG. 3B, it is required as a precondition that the DBA (330) has already expressed S88 equipment information (338) in the Batch Manager System's (350) S88 equipment database (351). This embodiment further requires that the S88 equipment information (338) has been made available (340), preferably in an open format such as XML. The information is then taken from the neutral batch representation 336 and the exported batch information 340 as a set and neutral recipe and formula translation rules 337 are applied in order to generate a document representing augmented batch information 341 which includes equipment information 351, recipe Information 352, and formula information 353 for subsequent incorporation into the batch manager's internal models. In the embodiment of FIG. 3B, the batch manager 350 has a native export mechanism that allowed the creation of the exported batch information 340 and the subsequent importation of the augmented batch information (equipment, recipe and formula information) 341.

Figure 3C:
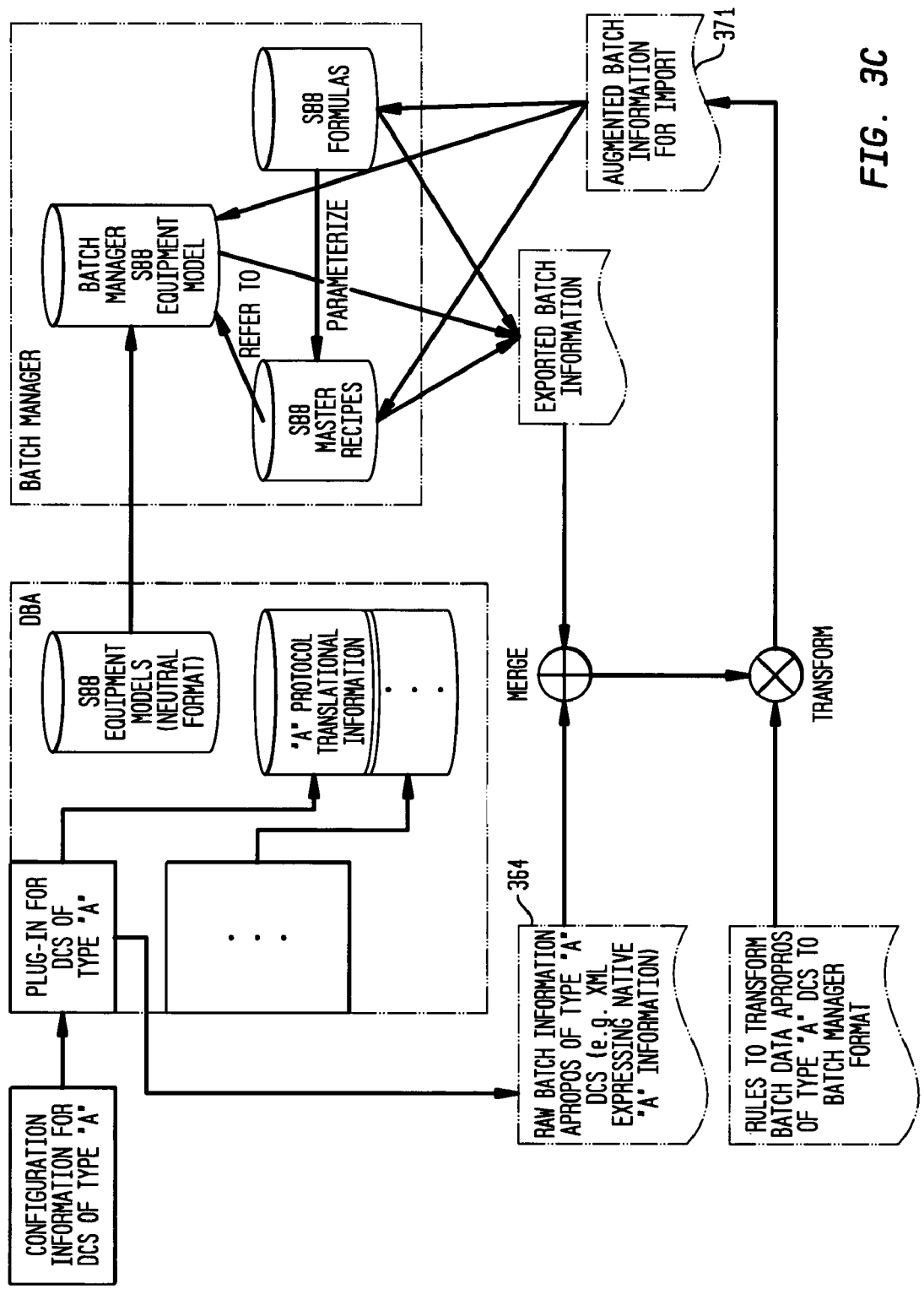

FIG. 3C shows a variation of this process wherein the exported type "A" batch information 364 is directly transformed to augmented batch information (equipment, recipe and formula information) 371. All other elements shown in FIG. 3C function similarly to the corresponding elements in FIG. 3B. Thus, as illustrated by FIGS. 3B and 3C, the DBA plug-ins are capable of recognizing and extracting batch-relevant information, thereby facilitating subsequent importation. Furthermore, the recipe and formula translation mechanism must be aware of the existing equipment information in the batch manager, and must ensure that the recipe information is in agreement with the equipment information, since the recipes refer to pieces of equipment. The translation mechanism must further ensure that formula information agrees with recipe information, since the formulas are used to parameterize the recipes.

Figure 5:
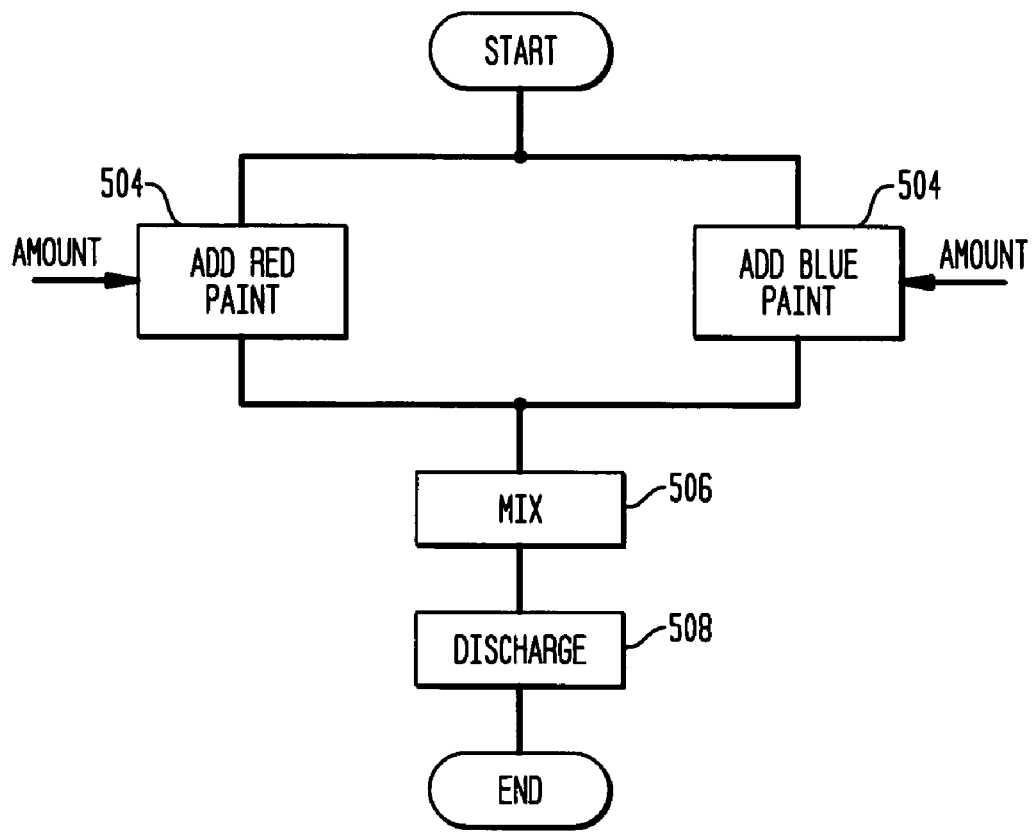
FIG. 5 illustrates an exemplary recipe for which a batch manager can control a batch process.

FIG. 5 illustrates an exemplary recipe for which the batch manager 106 can control a batch process. A recipe is the necessary set of information that uniquely defines the production requirements for a specific product. There are four types of recipes defined in the S88 standard: general, site, master, and control. The embodiment of the present invention described in FIGS. 3B and 3C involves translation of master recipes. A master recipe describes how to implement a specific batch of a given processing step on a specific piece of equipment. Since master recipes depend on the equipment model, it is important that the master recipe translation be aware of equipment information in the batch manager, as described above.

The exemplary recipe illustrated in FIG. 5 is a recipe to make purple paint. The recipe requires the use of a reactor to mix red and blue paint and a tank to store the resultant purple paint. Referring to FIGS. 1 and 5, when a batch of purple paint is desired, the batch manager 106 must select which reactor 118, 120, 122, or 124 to use to mix the batch and which tank 126 or 128 to use to store the purple paint. The batch manager 106 is aware of all of the reactors 118, 120, 122, and 124 in the DCS based on the S88 equipment information transmitted from the DBA 104. The run-time extension 110 presents status information associated with all of the equipment in each DCS in a format so that the batch manager 106 can consult the status information to determine the status of each piece of equipment. For example, the status information can indicate whether a piece of equipment is occupied or vacant, or whether an error has occurred with a piece of equipment. The batch manager 106 checks the status information, and chooses a reactor and a tank for the current batch. For example, the batch manager can choose reactor 1 118 and tank 1 126.

The batch manager 106 then transmits a command for reactor 1 118 to add red paint 502 and a command for reactor 1 118 to add blue paint 504. These commands are in S88 compliant protocol and instruct reactor 1 to perform the "add material" phase with red and blue paint. As described above, in order to perform the "add material" phase the parameter of the amount of material must be specified. Accordingly, the add red paint and add blue paint commands specify an amount of red paint and blue paint to add, respectively. As illustrated in FIG. 5, these commands can be issued in parallel. The batch manager 106 then transmits a command in S88 compliant protocol for reactor 1 118 to perform the mix phase 506 and specifies the amount of time to mix the paint. The batch manager then transmits a command in S88 compliant protocol for reactor 1 118 to perform the discharge material phase to discharge the mixed paint 506. This command can also be accompanied by a command for tank 1 126 to perform the "add material" phase to add the paint.

Figure 6:
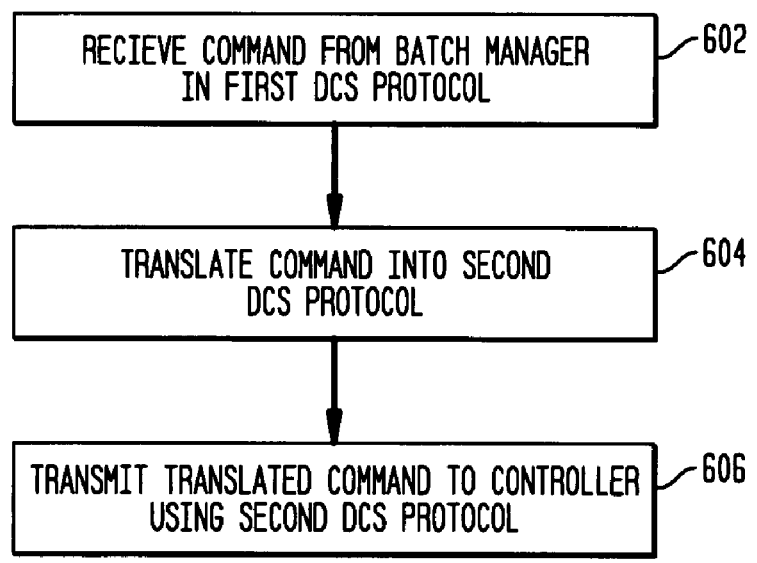
FIG. 6 is a flowchart illustrating a method of providing batch process control from a batch manager operating in a first DCS protocol and at least one controller operating in a second DCS protocol according to an embodiment of the present invention.

As described above, the batch manager 106 transmits commands in S88 compliant protocol. However, the controllers 112, 114, and 116 and the equipment 118-128 controlled by the controllers 112, 114, and 116 communicate using diverse DCS protocols. Accordingly, the run-time extension 110 acts as an adaptive layer between the batch manager 106 and the controllers 112, 114, and 116. FIG. 6 is a flowchart illustrating a method of providing batch process control from a batch manager operating in a first DCS protocol and at least one controller operating in a second DCS protocol according to an embodiment of the present invention. Referring to FIGS. 1 and 6, at step 602, the run-time extension 110 receives a command transmitted from the batch manager 106 in a first DCS protocol. According to an embodiment of the present invention, the command can be an S88 compliant command. As described above, the command is associated with some equipment information, such that the command is directed to controlling a specific piece of equipment.

At step 604, the run-time extension 110 translates the command received from the batch manager 106 into the second DCS protocol. The run-time extension 110 uses control logic to translate the S88 phase control commands into one or more control signals. These control signals that instruct the controller in the DCS protocol of the controller to perform an equivalent operation to the instructed phase control. According to one embodiment of the present invention, the run-time extension 110 is a state machine that will make the any of the batch manager's 106 commands intended for a controller 112, 114, or 116 look like that controller's 112, 114, or 116 vendor-specific protocol, and conversely make that controllers 112, 114, or 116 vendor-specific responses look like a generic response that the batch manager 106 can understand. This state machine is built by the DBA 104 prior to run-time. That is, the protocol translation logic associated with the second DCS protocol, which is transmitted to the gateway from the DBA 104, is executed, and defines rules which translate the command from the first DCS protocol to the second DCS protocol. This is shown in greater detail in FIG. 9.

According to another embodiment of the present invention, the run-time extension 110 determines which controller 112, 114, or 116 the command should be directed to and the DCS protocol of that controller 112, 114, or 116 at run-time. In this case, the run-time extension 110 determines a controller that is associated with the equipment information. That is, the run-time extension 110 determines which controller 112, 114, or 116 controls the piece of equipment that is associated with the command transmitted from the batch manager 106. Once the run-time extension 110 determines the controller 112, 114, or 116 that controls the equipment associated with the command, the run-time extension 110 can determine the native protocol (i.e., vendor specific protocol) of that controller 112, 114, or 116 based on the controller information transmitted from the DBA 104. The run-time extension then translates the command received from the batch manager 106 into the second DCS protocol.

At step 606, the run-time extension 110 transmits the translated command to the controller in the second DCS protocol. As described above, the translated command may include one or more control signals for instructing the controller in the DCS protocol of the controller. In response to these control signals, the controller controls the equipment associated with that controller to perform the operations as instructed in the control signals.

Figure 7:
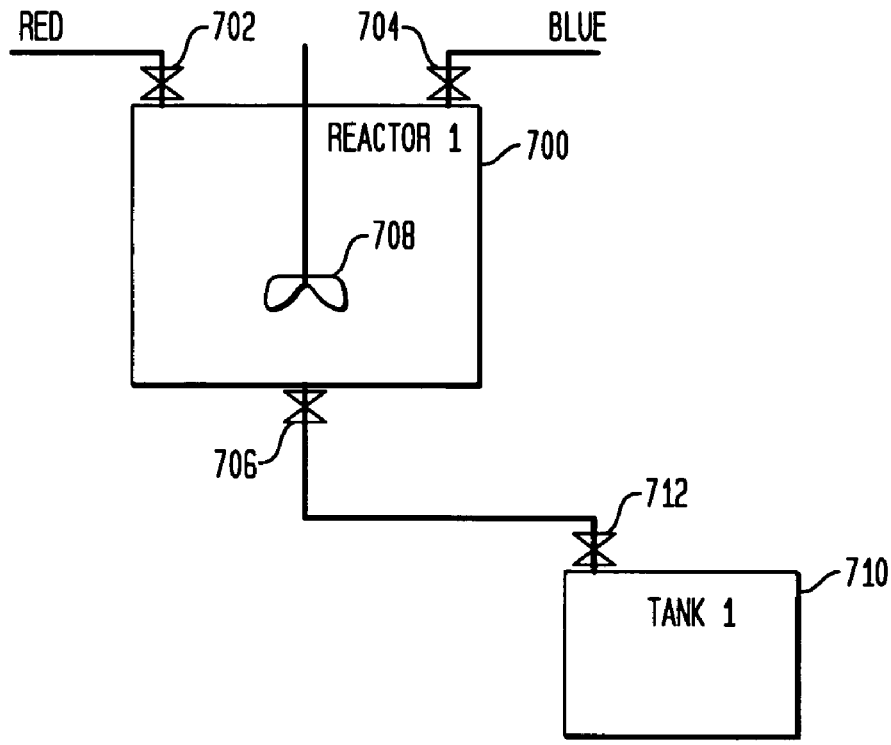
FIG. 7 illustrates equipment in the DCS being controlled in response to commands translated by a run-time extension.

FIG. 7 illustrates equipment in the DCS being controlled in response to commands translated by the run-time extension 110. As illustrated in FIG. 7, reactor 1 700 (118 of FIG. 1) and tank 1 710 (126 of FIG. 1) are controlled by translated commands to perform the steps of the recipe illustrated in FIG. 5. For example, when the batch manager 106 transmits the command to perform the add material phase for a specified amount of red paint, controller A 112 receives the translated command in the native DCS protocol of controller A. In response to this translated command, corresponding phase logic in controller A 112 controls valve 702 to open for a specified amount of time to achieve the specified amount of red paint and valve 706 to close so the red paint does not drain out of 1 700. Similarly, in response to receiving the translated command to perform the add material phase for a specified amount of blue paint, the phase logic of controller A 112 controls valve 704 to open for a specified amount of time and valve 706 to close. In response to receiving the translated command to perform the mix phase, the phase logic of controller A 112 supplies power to mixer 708. In response to receiving the translated command to perform the discharge material phase, the phase logic of controller A 112 controls valve 706 to open. When the batch manager 106 transmits the command for tank 1 to perform the "add material" phase, the command is translated by the run-time extension 110 and the translated command is received by controller C 116. In response to receiving this translated command, corresponding phase logic in controller C 116 controls valve 712 to open for a specified amount of time.

Figure 8:
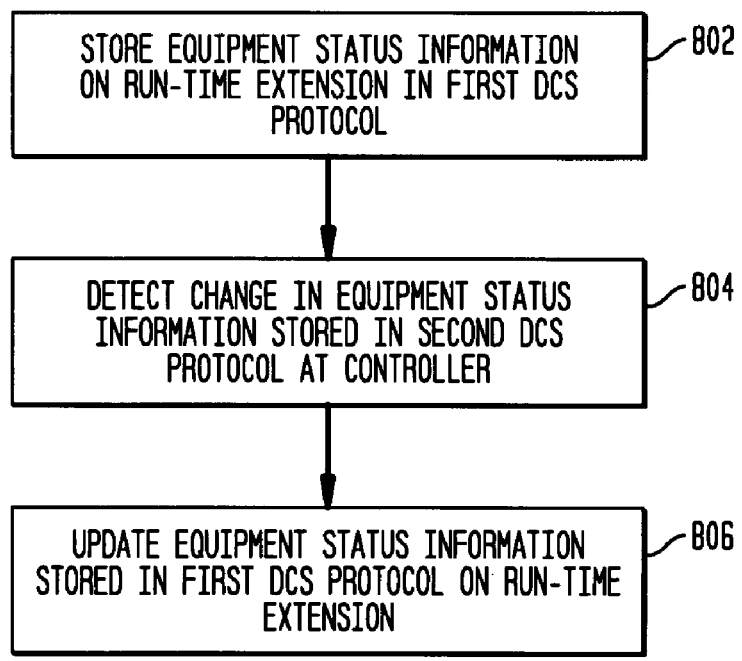
FIG. 8 is a flow chart directed to a method of presenting uniform equipment status information to a batch manager according to an embodiment of the present invention.

FIG. 8 is a flow chart directed to a method of presenting uniform equipment status information to the batch manager 106. As described above, the run-time extension presents equipment status information in a uniform format, such as an S88 compliant format, so that the batch manager 106 can effectively supervise all of the equipment in the DCS. As illustrated in FIG. 8, at step 802, the run-time extension 110 stores equipment status information in a first DCS protocol. The first DCS protocol corresponds to the DCS protocol of the batch manager 106, and is used as a uniform format for storing all equipment status information on the run-time extension 110. The first DCS protocol may be an S88 compliant protocol. At step 804, the run-time extension 10 detects a change in equipment status information stored in a second DCS protocol at a controller. At step 806, the run-time extension 110 updates the equipment status information stored in the first DCS protocol in response to the detected changes. Thus, the status of equipment operating with controllers in diverse DCS protocols are continuously updated and translated into a common format, to allow a single batch controller 106 to simultaneously supervise the diverse controllers.

Figure 9:
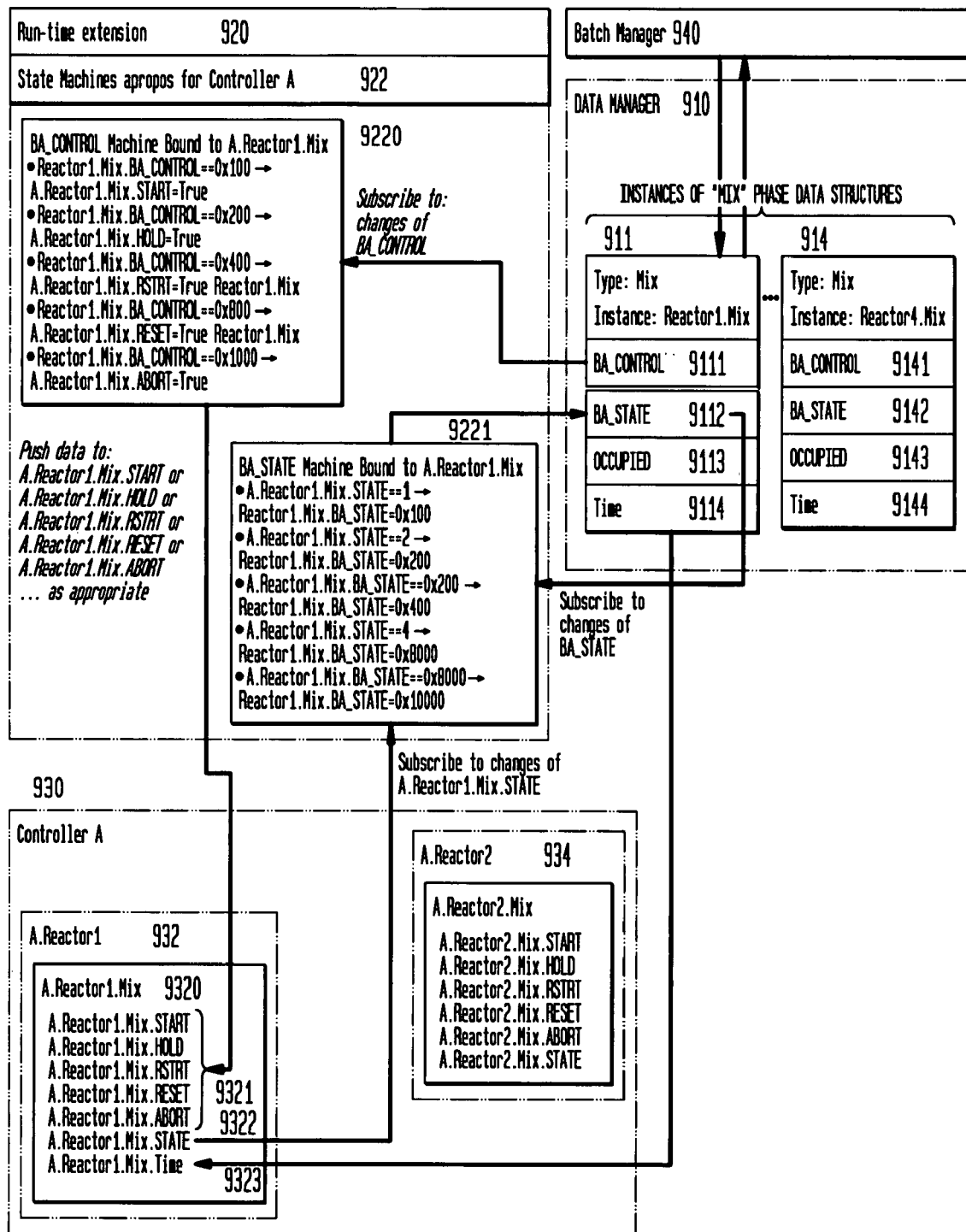
FIG. 9 illustrates a detailed adaptation layer formed between controllers and the batch manager according to an embodiment of the present invention.

As described above, the runtime extension forms an adaptation layer between the batch manager and various controllers which utilize diverse DCS protocols. FIG. 9 illustrates this adaptation layer in greater detail according to an embodiment of the present invention. The batch manager 940 does not communicate directly with entities controlled by the controllers that it manages. Rather, the batch manager 940 communicates indirectly through a data manager 910. The data manager 910 provides a uniform interface to data items called tags (e.g. 9111-9144). In some cases, these tags are just data storage items inside the data manager 910. In other cases, such as Reactor1.Mix.Time 91105, the tags are an image of data contained in an actual controller. The batch manager 940 communicates with phases (e.g. the Reactor1.Mix phase 911) via the BA_CONTROL, BA_STATE and OCCUPIED tags 9111, 9112, and 9113 of the phase 911.

The Batch Manger 40000 sends commands to the phase Reactor1.Mix 911 by writing to its BA_CONTROL tag 9111. State machines 922 for managing controller A 930 are running on the runtime extension 920. Changes to the Reactor1.Mix.BA_CONTROL tag 9111 are observed by an instance of a protocol translation state machine 9220 for managing translating the batch manager control protocol to corresponding commands that are sent to elements in controller A 930. For example, when the batch manager 940 sends a hex value 0x100, corresponding to the command "Start", the controller A BA_CONTROL state machine 9220 will send the value "TRUE" to the tag A.Reactor1.Mix.START. Similarly, when the Batch Manager 940 sends a hex value 0x200, corresponding to the command "HOLD", the controller A BA_CONTROL state machine 9220 will send the value "TRUE" to the tag A.Reactor1.Mix.HOLD. In this embodiment, the state machine 9220 translates BA_STATE values to individual tag writes to specific items in controller A 930.

The Batch Manager 940 receives notification of changes in the state of phases via the BA_STATE tag, for example, controller A Reactor1Mix's BA_STATE tag 9112. Reactor1.Mix.BA_STATE tag 9112 is controlled by a state machine 9221. As illustrated in FIG. 9, for each reactor 932 and 934 controlled by controller A 930, controller A 930 stored various tags (e.g., 9321, 9322, 9323). In the example shown in FIG. 9, the BA_STATE state machine 9221 subscribes to changes in controller A's A.Reactor1.Mix.STATE tag 9322 and subscribes to changes in the very Reactor1Mix.BA_STATE tag 9112 that it controls. In our example, a change of A.Reactor1.Mix.STATE tag 9322 to the value 1, indicating "RUNNING" will result in a corresponding write to the Reactor1Mix.BA_STATE tag 9112 of the hex value 0x100, which informs the Batch Manager 940 that the phase is now in a RUNNING state. Similarly, a change of A.Reactor1.Mix.STATE tag 9322 to the value 2, indicating "HOLD" will result in a corresponding write to the Reactor1Mix.BA_STATE tag 9112 of the hex value 0x200, which informs the Batch Manager 940 that the phase is now in a HOLDING state. Since the BA_STATE state machine 9221 subscribes to the Reactor1Mix.BA_STATE tag 9112, it will see the value of Reactor1Mix.BA_STATE 91102 change some time later to the value 0x200 and it will react by writing the value 0x400 to Reactor1Mix.BA_STATE 9112, informing the batch manager 940 that the phase is now in a HOLD state. Note that this mechanism has effectively taken controller A's "HOLD" state and augmented it with a preceding "HOLDING" state that is expected by the batch manager 940. In this embodiment, the state machine 9221 not only translates values, but also synthesizes additional, necessary state information as part of its protocol translation.

According to various embodiments of the present invention, the translation state machines may be substantially more complex and employ all of the above described mechanisms, such as, value→tag mapping, value→value mapping, and state augmentation, as well as having complicated interaction between various entities in the data manager and the control target. The above examples are only representative descriptions and the present invention is not limited thereto.

In order to construct the translation state machines, information regarding the "type" of entity that they are managing (e.g. Unit, Phase etc.) and the type of controller that hosts the entity is needed. As described above, the DBA acquires such information from the controllers via DBA plug-ins. Using this information, the DBA can construct and parameterize the state machine properly. Once a state machine is constructed by the DBA, the state machine runs at the runtime extension and all of the complex re-direction and state management involved in the batch management protocol translation is automatically performed by the state machine in the runtime extension.

According to an embodiment of the present invention, it is possible that two run-time adaptation layers, as illustrated in FIG. 9, run simultaneously. The adaptation layers can be run simultaneously in a coordinated manner for the purposes of implementing fail-over redundancy.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of providing run-time batch process control between a batch manager operating in a first distributed control system (DCS) protocol and at least one controller operating in at least one second DCS protocol comprising:
   receiving a command associated with equipment information in a first DCS protocol from a batch manager at a run-time adaptation layer between the batch manager and at least one controller;
   translating said command into a second DCS protocol based on a controller associated with said equipment information; and
   transmitting the translated command from the run-time adaptation layer to said controller in said second DCS protocol.

2. The method of claim 1, wherein said first DCS protocol is an S88 compatible protocol.

3. The method of claim 1, wherein said second DCS protocol is a native protocol of a legacy DCS system.

4. The method of claim 1, wherein said step of translating said command into a second DCS protocol comprises:
   executing pre-configured protocol translation logic associated with said controller.

5. The method of claim 4, wherein said pre-configured protocol translation logic is stored in an intermediate, persistent configuration format.

6. The method of claim 4, wherein said step of executing pre-configured translation logic associated with said controller comprises:
   simultaneously executing at least two run-time adaptation layers in a coordinated manner for implementing failover redundancy.

7. The method of claim 1, wherein said equipment information comprises a data tag associated with said first DCS protocol, and said step of receiving a command comprises:
   receiving a value for said data tag associated with said first DCS protocol.

8. The method of claim 7, wherein said step of translating said command into a second DCS protocol comprises:
   determining a value for at least one data tag associated with said second DCS protocol based on the value of said data tag associated with said first DCS protocol.

9. The method of claim 1, further comprising:
   determining said controller associated with said equipment information in response to receiving said command; and
   determining a second DCS protocol associated with said controller prior to translating said command into said second DCS protocol.

10. A method for run-time presentation of equipment status information in a uniform format to a batch manager comprising:
    presenting, by a run-time adaptation layer between a batch manager and at least one controller, equipment status information in a first distributed control system (DCS) protocol;
    detecting, by the run-time adaptation layer, a change in equipment status information in a second DCS protocol at a controller; and
    updating the equipment status information in the first DCS protocol presented to the batch manager by the run-time adaptation layer based on detecting the change in the equipment status information in the second DCS protocol at said controller.

11. The method of claim 10, wherein said step of updating the equipment status information in the first DCS protocol information comprises:
    executing pre-configured protocol translation logic associated with said controller to translate said equipment status information in said second DCS protocol information to said first DCS protocol.

12. The method of claim 10, wherein said first DCS protocol is an s88 compatible DCS protocol.

13. A method of configuring a distributed control system (DCS) having a plurality of controllers utilizing diverse DCS protocols, comprising:
    extracting configuration information associated with said diverse DCS protocols from the plurality of controllers;
    generating protocol translation logic associated with each of said plurality of controllers based on said configuration information, said protocol translation logic for run-time translation between each of said diverse DCS protocols and a uniform DCS protocol; and
    transmitting said protocol translation logic to a gateway device.

14. The method of claim 13, further comprising:
    mapping said configuration information into equipment information in said uniform DCS protocol; and
    storing said equipment information in a database.

15. The method of claim 14, further comprising:
    transmitting said equipment information in said uniform DCS protocol to a batch manager.

16. The method of claim 14, wherein said equipment information is an s17 physical model.

17. The method of claim 13, wherein said protocol translation logic comprises at least one state machine for run-time translation of commands in said uniform DCS protocol to at least one of said diverse DCS protocols.

18. The method of claim 13, wherein said protocol translation logic comprises at least one state machine for run-time translation of status information in at least one of said diverse DCS protocols to said uniform DCS protocol.

19. An apparatus for providing run-time batch process control between a batch manager operating in a first distributed control system (DCS) protocol and at least one controller operating in at least one second DCS protocol, comprising:
    means for receiving a command associated with equipment information in a first DCS protocol from a batch manager at a run-time adaptation layer between the batch manager and at least one controller;
    means for translating said command into a second DCS protocol based on a controller associated with said equipment information; and
    means for transmitting the translated command from the run-time adaptation layer to said controller in said second DCS protocol.

20. The apparatus of claim 19, wherein said first DCS protocol is an S88 compatible protocol.

21. The apparatus of claim 19, wherein said second DCS protocol is a native protocol of a legacy DCS system.

22. The apparatus of claim 19, wherein said means for translating said command into a second DCS protocol comprises:
    means for executing pre-configured protocol translation logic associated with said controller.

23. The apparatus of claim 19, further comprising:
means for determining said controller associated with said equipment information in response to receiving said command; and
means for determining a second DCS protocol associated with said controller prior to translating said command into said second DCS protocol.

24. The method of claim 19, further comprising:
means for detecting a change in second DCS protocol information at said controller; and
means for updating first DCS protocol information in response to detecting the change in said second DCS protocol information at said controller.

25. The apparatus of claim 19, further comprising:
means for presenting said first DCS protocol information to a batch manager.

26. An apparatus for configuring a distributed control system (DCS) having a plurality of controllers utilizing diverse DCS protocols, comprising:
means for extracting configuration information associated with said diverse DCS protocols from the plurality of controllers;
means for generating protocol translation logic associated with each of said plurality of controllers based on said configuration information, said protocol translation logic for run-time translation between each of said diverse DCS protocols and a uniform DCS protocol; and
means for transmitting said protocol translation logic to a gateway device.

27. The apparatus of claim 26, further comprising:
means for mapping said configuration information into equipment information in said uniform DCS protocol; and
means for transmitting said equipment information in said uniform DCS protocol to a batch manager.

28. A non-transitory computer readable medium encoded with computer executable instructions for providing run-time batch process control between a batch manager operating in a first distributed control system (DCS) protocol and at least one controller operating in at least one second DCS protocol, the computer executable instructions defining steps comprising:
receiving a command associated with equipment information in a first DCS protocol from a batch manager at a run-time adaptation layer between the batch manager and at least one controller;
translating said command into a second DCS protocol based on a controller associated with said equipment information; and
transmitting the translated command from the run-time adaptation layer to said controller in said second DCS protocol.

29. The computer readable medium of claim 28, wherein the computer executable instructions defining the step of translating said command into a second DCS protocol comprises computer executable instructions defining the step of:
executing pre-configured protocol translation logic associated with said controller.

30. The computer readable medium of claim 28, wherein the computer executable instructions further defines the steps of:
determining said controller associated with said equipment information in response to receiving said command; and
determining a second DCS protocol associated with said controller prior to translating said command into said second DCS protocol.

31. The computer readable medium of claim 28, wherein the computer executable instructions further define the steps of:
detecting a change in second DCS protocol information at said controller; and
updating stored first DCS protocol information based on detecting the change in said second DCS protocol information at said controller.

32. A non-transitory computer readable medium encoded with computer executable instructions for configuring a distributed control system (DCS) having a plurality of controllers utilizing diverse DCS protocols, the computer executable instructions defining steps comprising: extracting configuration information associated with said diverse DCS protocols from the plurality of controllers; generating protocol translation logic associated with each of said plurality of controllers based on said configuration information, said protocol translation logic for translating run-time translation between each of said diverse DCS protocols and a uniform DCS protocol; and transmitting said protocol translation logic to a gateway device.

33. The computer readable medium of claim 32, wherein the computer executable instructions further define the steps of:
mapping said configuration information into equipment information in said uniform DCS protocol; and
transmitting said equipment information in said uniform DCS protocol to a batch manager.

34. A distributed control system (DCS) comprising:
a batch manager configured to transmit commands in a first DCS protocol;
a run-time extension configured to translate said commands into a second DCS protocol; and
at least one controller configured to receive translated commands in said second DCS protocol from said run-time extension, and to control designated equipment in response to said translated commands.

35. The DCS of claim 34, further comprising:
a database automation object configured to extract equipment information in said second DCS protocol from said at least one controller and to generate equipment information in said first DCS protocol based on said equipment information in said second DCS protocol.

36. The DCS of claim 35, wherein said equipment information in said first DCS protocol is stored at said batch manager.

37. The DCS of claim 35, wherein said database automation object is configured to generate protocol translation logic for translating between said first and second DCS protocols and said protocol translation logic is executed in said run-time extension.

38. The DCS of claim 34, wherein said run-time extension is configured to detect changes in information associated with said at least one controller in said second DCS protocol and to update information associated with said at least one controller in said first DCS protocol in response to said changes.

* * * * *